United States Patent
Ohishi

(10) Patent No.: US 8,385,717 B2
(45) Date of Patent: Feb. 26, 2013

(54) REPRODUCING APPARATUS, REPRODUCING METHOD, AND PROGRAM THAT STORES REPRODUCTION-STOP POSITION INFORMATION

(75) Inventor: Chikara Ohishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 785 days.

(21) Appl. No.: 12/500,030

(22) Filed: Jul. 9, 2009

(65) Prior Publication Data

US 2010/0054695 A1 Mar. 4, 2010

(30) Foreign Application Priority Data

Aug. 27, 2008 (JP) ................... 2008-218009

(51) Int. Cl.
*H04N 9/80* (2006.01)
(52) U.S. Cl. ........................ 386/241; 386/248
(58) Field of Classification Search .................. 386/240, 386/241, 248
See application file for complete search history.

(56) References Cited

U.S. PATENT DOCUMENTS 6,832,040 B2 * 12/2004 Sakuramoto et al. ......... 386/241

FOREIGN PATENT DOCUMENTS

| JP | 2004-206784 | | 7/2004 |
|---|---|---|---|
| JP | 2007-257714 | | 10/2007 |
| JP | 2008-140440 | | 6/2008 |
| JP | 2008-165872 | * | 7/2008 |
| JP | 2009-152946 | | 7/2009 |

OTHER PUBLICATIONS

Machine generated translation of JP 2008-165872 to Shibata, Jul. 2008.*

* cited by examiner

*Primary Examiner* — David Harvey
(74) *Attorney, Agent, or Firm* — Oblon, Spivak, McClelland, Maier & Neustadt, L.LP.

(57) ABSTRACT

There is provided a reproducing apparatus. The reproducing apparatus includes acquisition section configured to read out recorded data from a disk and acquire related data related to the recorded data, reproducing section configured to generate data by using the recorded data read out by the acquisition section and the related data acquired by the acquisition section and output the data as reproduced data, generating section configured to generate specific information that specifies the related data based on data appended to the related data acquired by the acquisition section, and memory control section configured to cause memory section to store reproduction-stop position information indicating reproduction-stop position on the disk and the specific information when the reproduction of the reproducing section is halted.

6 Claims, 8 Drawing Sheets

REPRODUCING APPARATUS, REPRODUCING METHOD, AND PROGRAM THAT STORES REPRODUCTION-STOP POSITION INFORMATION

BACKGROUND OF THE INVENTION

1. Field of the Invention

The present invention relates to a reproducing apparatus, a reproducing method, and a program. More particularly, the present invention relates to a reproducing apparatus, a reproducing method, and a program capable of preventing different reproduced data being reproduced from previous reproduction-stop position when reproduction of a disk is performed by using recorded data recorded on the disk and related data related to the recorded data.

2. Description of the Related Art

Among related disk reproducing apparatuses, there is a disk reproducing apparatus in which reproduction is resumed from previous reproduction-stop position when reproduction of disk is haled in the middle of the reproduction and is resumed. In that kind of disk reproducing apparatus, information indicating reproduction-stop position is retained as resume information at the time of reproduction stop and reproduction is resumed from the reproduction-stop position indicated by the resume information, as disclosed in Japanese Patent Laid-open No. 2004-206784, for example.

On the other hand, recently, a reproducing apparatus for reproducing information on a disk such as Blu-ray Disc read only memory (BD-ROM) or the like has been able to reproduce information on the disk with VFS (Virtual File System).

When information on a disk is reproduced with VFS, reproduction of information on the disk is performed with recorded data on the disk and related data, stored in an internal memory of a disk reproducing apparatus or an external memory, which is related to the recorded data.

Accordingly, in this case, even though recorded data on a same disk is reproduced, it may happen that a difference of the related data causes reproduced data to be completely different.

SUMMARY OF THE INVENTION

However, even though related data is different, reproduction of the disk reproducing apparatus, as described above, from reproduction-stop position indicated by resume information retained at the time of reproduction stop leads to reproduction from previous reproduction-stop position if the disk is same.

The invention addresses the above-described circumstances and it is desirable to prevent different reproduced data being reproduced from previous reproduction-stop position when reproduction of a disk is performed by using recorded data recorded on the disk and related data related to the recorded data.

According to an embodiment of the present invention, there is provided a reproducing apparatus including acquisition means configured to read out recorded data from a disk and acquire related data related to the recorded data, reproducing means configured to generate data by using the recorded data read out by the acquisition means and the related data acquired by the acquisition means and output the data as reproduced data, generating means configured to generate specific information that specifies the related data based on data appended to the related data acquired by the acquisition means, and memory control means configured to cause memory means to store reproduction-stop position information indicating reproduction-stop position on the disk and the specific information when the reproduction of the reproducing means is halted.

According to another embodiment of the present invention, there is provided a reproducing method, performed in a reproducing apparatus, including the steps of acquiring related data related to recorded data with reading out the recorded data from a disk, reproducing data with generating the data by use of the recorded data read out by the acquiring step and the related data acquired by the acquiring step and outputting the data as reproduced data, generating specific information that specifies the related data based on data appended to the related data acquired by the acquiring step, and controlling memory means to store reproduction-stop position information indicating reproduction-stop position on the disk and the specific information when the reproduction of the reproducing step is halted.

According to another embodiment of the present invention, there is provided a program including instructions that command a computer to function as a reproducing apparatus including acquisition means configured to read out recorded data from a disk and acquire related data related to the recorded data, reproducing means configured to generate data by using the recorded data read out by the acquisition means and the related data acquired by the acquisition means and output the data as reproduced data, generating means configured to generate specific information that specifies the related data based on data appended to the related data acquired by the acquisition means, and memory control means configured to cause memory means to store reproduction-stop position information indicating reproduction-stop position on the disk and the specific information when the reproduction of the reproducing means is halted.

According to another embodiment of the present invention, related data related to recorded data is acquired with the recorded data from a disk being read out, data is generated by using the recorded data and the related data, the data is outputted as reproduced data, specific information that specifies the related data is generated based on data appended to the related data, and reproduction-stop position information indicating reproduction-stop position on the disk and the specific information are stored in memory means when the reproduction of the reproducing step is halted.

As described above, according to an embodiment of the present invention, it is possible to prevent different reproduced data being reproduced from previous reproduction-stop position when reproduction of a disk is performed by using recorded data recorded on the disk and related data related to the recorded data.

DESCRIPTION OF THE PREFERRED EMBODIMENTS

Figure 1:
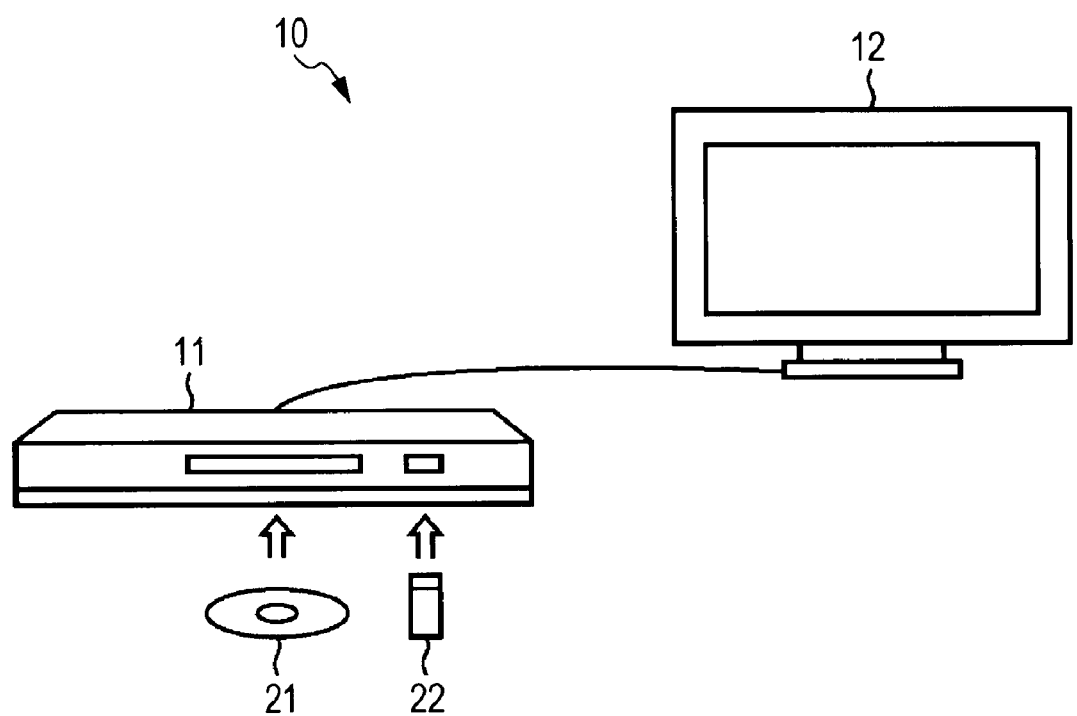
FIG. 1 is a block diagram schematically showing a configuration example of a reproduction system according to an embodiment of the present invention.

FIG. 1 represents a configuration example of an embodiment of a reproduction system to which the present invention is applied.

The reproduction system 10 of FIG. 1 includes a reproducing apparatus 11 and a display apparatus 12, and causes an image based on reproduced data reproduced by the reproducing apparatus 11 to be displayed on the display apparatus 12.

A disk 21 such as BD-ROM or the like is loaded into the reproducing apparatus 11. Also, as needed, an external memory 22 as local User Expandable Storage capable of being detached by a user is connected to the reproducing apparatus 11. As an example of the external memory 22, there is memory card or flash memory or HDD (Hard Disk Drive) to be connected with USB (Universal Serial Bus) cable (not shown) etc.

The reproducing apparatus 11 reproduces, as disk package, recorded data recorded on the disk 21 and including an image data or the like. Specifically, the reproducing apparatus 11 reads out recorded data from the disk 21 and directly outputs the recorded data as reproduced data to the display apparatus 12.

In addition, by using VFS, the reproducing apparatus 11 reproduces virtual package in which recorded data recorded on the disk 21 is combined with related data (for example, data for updating the recorded data) which is stored in an external memory 22 and related to the recorded data. Specifically, the reproducing apparatus 11 reads out the recorded data from the disk 21 while reading out the related data from the external memory 22. Then, the reproducing apparatus 11 generates data by using the recorded data and related data and outputs the data as reproduced data to the display apparatus 12.

The display apparatus 12 displays an image based on the reproduced data supplied from the reproducing apparatus 11.

Figure 2:
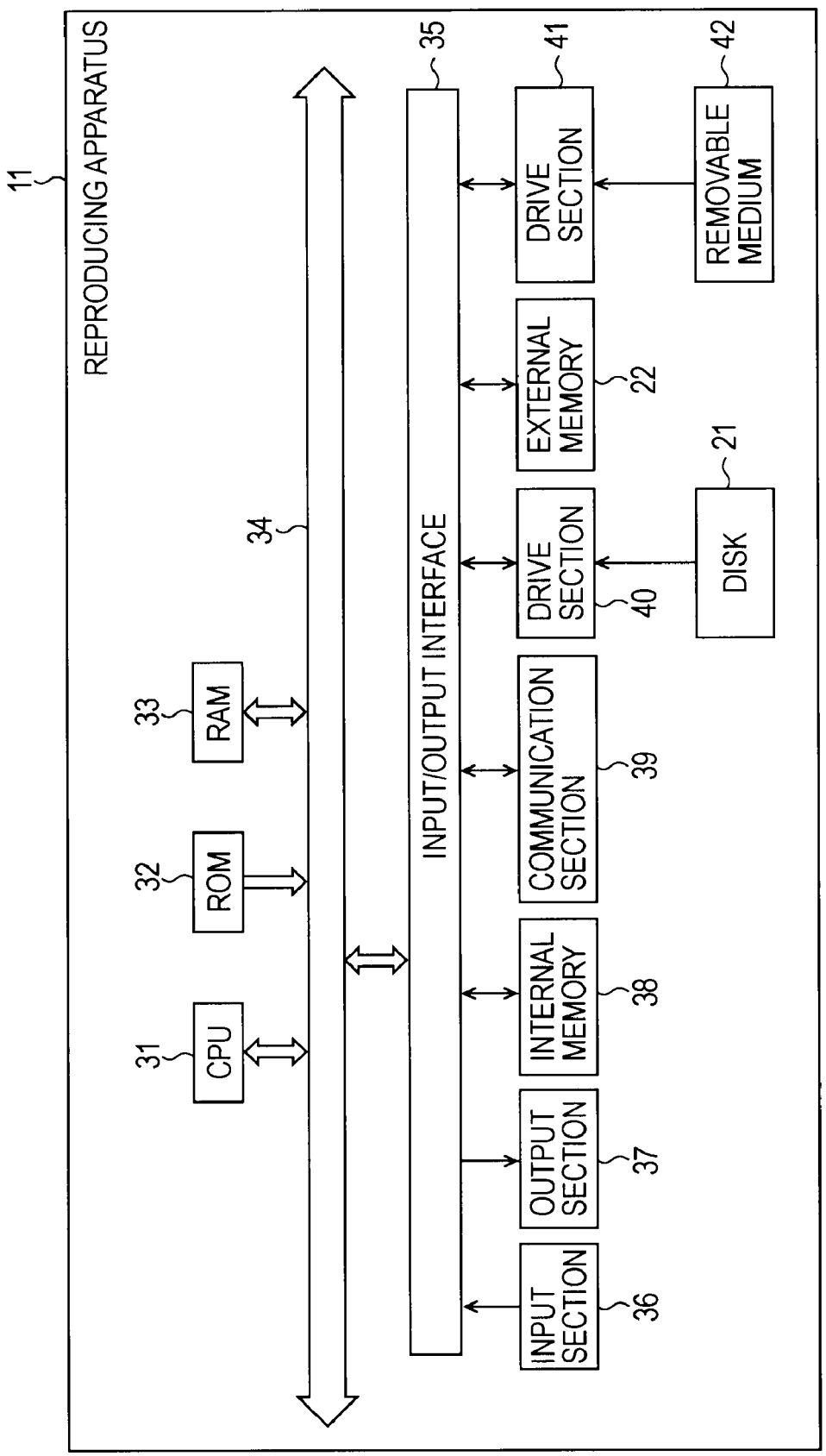
FIG. 2 is a block diagram schematically showing a hardware configuration example of the reproducing apparatus according to the embodiment of the present invention.

FIG. 2 is a block diagram showing an example of a hardware configuration of the reproducing apparatus 11 shown in FIG. 1.

In the reproducing apparatus 11 shown in FIG. 2, a CPU (Central Processing Unit) 31, a ROM (Read Only Memory) 32, and a RAM (Random Access Memory) 33 are connected mutually with a bus 34.

Furthermore, an input-output interface 35 is connected to the bus 34. An input section 36 including a receiving section which receives a command transmitted from a remote controller and an output section 37 outputting the reproduced data to the display apparatus 12 are connected to the input-output interface 35.

Also, an internal memory 38 including a HDD or a non-volatile memory such as a flash memory or the like and a communication section 39 including a network interface or the like are connected to the input-output interface 35.

Furthermore, a drive section 40 driving the disk 21, the external memory 22, and a drive section 41 driving a removable medium 42 are connected to the input-output interface 35. For instance, the removable medium 42 is a package medium such as a magnetic disk (e.g., a flexible disk), an optical disk (e.g., a CD-ROM (Compact Disc-Read Only Memory) or a DVD (Digital Versatile Disc)), a magnet-optical disk, or a semiconductor memory.

In the reproducing apparatus 11 configured as described above, the CPU 31, for example, executes a program stored in the internal memory 38 by loading the program through the input-output interface 35 and the bus 34 into the RAM 33, so that various kinds of processes are performed.

The program executed by the CPU 31 is provided through the removable medium 42 in which the program is recorded or through wired or wireless transmission medium such as local area network, Internet, or Digital Satellite Broadcasting.

The program may be installed into the internal memory 38 through the input-output interface 35 by loading the removable medium 42 into the drive section 41. Also, the program may be received by a communication section 39 through a wired or wireless transmission medium and installed into the internal memory 38. Or, the program may be installed into the ROM 32 or the internal memory 38 in advance.

Also, for example, the related data stored in the external memory 22 is acquired through Internet or copied from a removable medium. In addition, the related data may be data stored by connecting external memory 22 to a Personal Computer which generates the related data.

Figure 3:
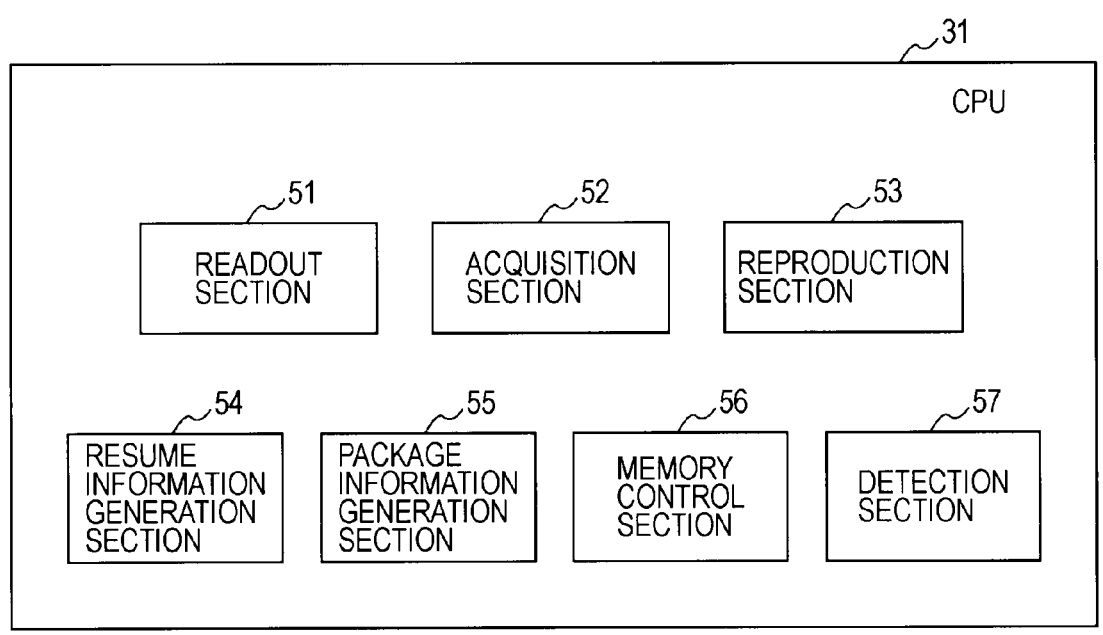
FIG. 3 is a block diagram schematically showing a functional configuration example of the CPU in the reproducing apparatus according to the embodiment of the present invention.

Next, FIG. 3 shows a functional configuration example of the CPU 31 in the reproducing apparatus 11.

In FIG. 3, the CPU 31 includes a readout section 51, an acquisition section 52, a reproduction section 53, a resume information generation section 54, a package information generation section 55, a memory control section 56, and a detection section 57.

The readout section 51 reads out resume information and package information which are stored in the internal memory 38 by the memory control section 56 and supplies the acquisition section 52 with the resume information and package information. In addition, the resume information is information related to previous reproduction such as information indicating previous reproduction-stop position on the disk 21 (for example, title Number at the time of previous reproduction stop) or various kinds of setting information related to previous reproduction.

Also, the package information is information related to a package such as package type indicating whether previously-reproduced package is a disk package or a virtual package or specific information specifying related data used in previous reproduction. Status of the previously-reproduced package is uniquely specified with the package information.

The acquisition section 52 controls the drive section 40 based on the resume information and package information supplied from the readout section 51, reads out the recorded data from previous reproduction-stop position or a starting position on the disk 21, and supplies the reproduction section 53 with the recorded data.

In addition, the acquisition section 52 reads out the related data from the external memory 22 based on the resume information and package information supplied from the readout section 51 and supplies the reproduction section 53 with the related data. Furthermore, the acquisition section 52 supplies the package information generation section 55 with an electronic signature (Signature) appended to the read-out related data.

The reproduction section 53 performs disk package reproduction (normal reproduction) by directly outputting, as reproduced data, the recorded data, supplied from the acquisition section 52, to the display apparatus 12. In addition, the reproduction section 53 performs virtual package reproduction (special reproduction) with generating data by use of the related data and recorded data supplied from the acquisition section 52 and outputting the generated data as reproduced data to the display apparatus 12.

When reproduction of the reproduction section 53 is halted, the resume information generation section 54 generates resume information and supplies the memory control section 56 with the resume information.

The package information generation section 55 generates, as specific information, hash value of the electronic signature supplied from the acquisition section 52. Also, when reproduction of the reproduction section 53 is halted, the package information generation section 55 generates package type of reproduced data which has been reproduction object until then. Then, the package information generation section 55 supplies the memory control section 56, as package information, with package type indicating a virtual package and specific information or with package type indicating a disk package.

The memory control section 56 causes the internal memory 38 (memory means) to store the resume information supplied from the resume information generation section 54 and the package information supplied from the package information generation section 55. In addition, when a deletion signal is supplied from the detection section 57, the memory control section 56 deletes the resume information and package information in the internal memory 38.

The detection section 57 detects unloading of the disk 21 in response to an event from the drive section 40. Then, when the detection section 57 detects unloading of the disk 21, the detection section 57 supplies the memory control section 56 with a deletion signal for deleting the resume information.

Next, details of the virtual package and disk package will be described with reference to FIGS. 4A and 4B.

Figure 4A:
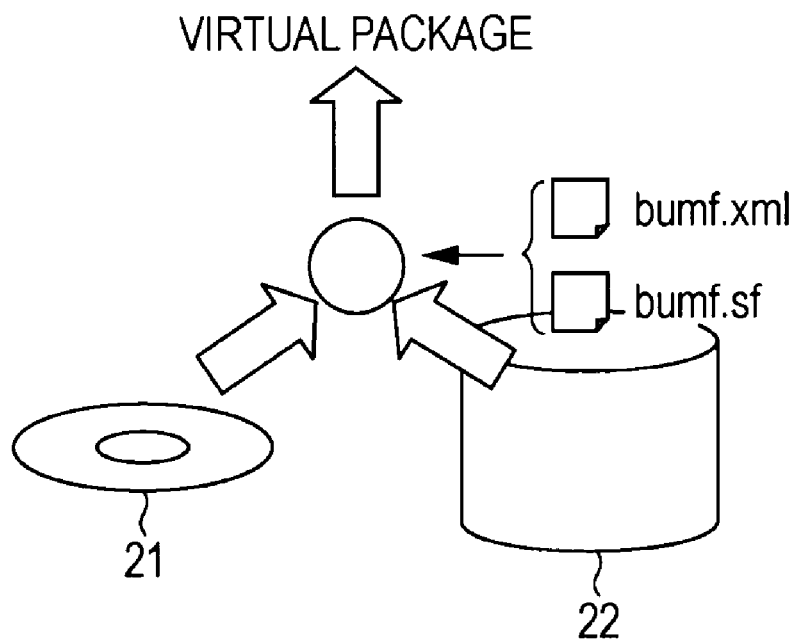
FIGS. 4A and 4B are schematic illustrations explaining details of a virtual package and a disk package according to the embodiment of the present invention.

At first, as shown in FIG. 4A, bumf.xml file and bumf.sf file are appended to the related data stored in the external memory 22. In the bumf.xml file, configuration of the virtual package is described, and, in the bumf.sf file, an electronic signature for preventing falsification of the related data is described.

As shown in FIG. 4A, the virtual package is generated by using the recorded data and related data read out based on the bumf.xml file and bumf.sf file.

Figure 4B:
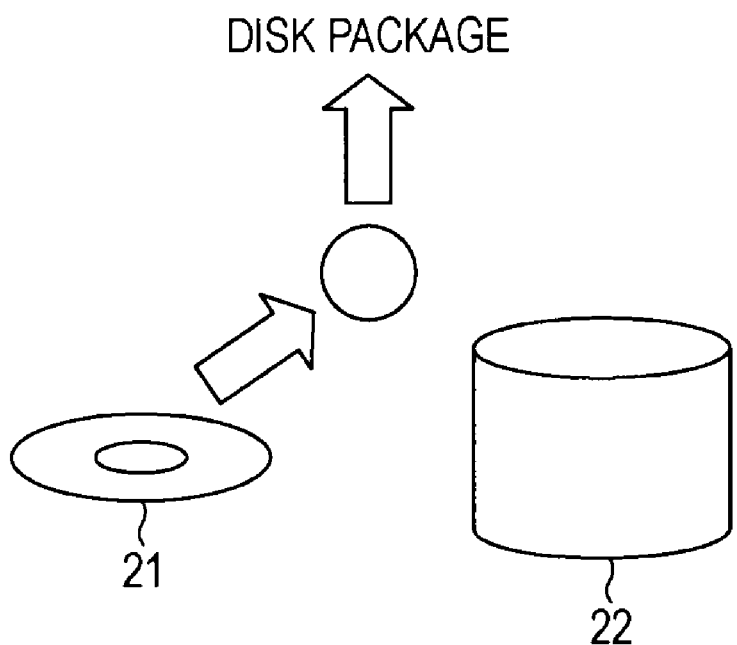

On the other hand, as shown in FIG. 4B, the disk package is generated by using only the recorded data recorded on the disk 21.

As described above, the virtual package is generated by using not only the recorded data but also the related data stored in the external memory 22. Therefore, even though the disk 21 is same, a difference of the related data causes a content of the virtual package to be different.

Therefore, it is preferred that the memory control section 56 in FIG. 3 invalidates the resume information not only when the disk 21 is unloaded but also when the external memory 22 is unloaded or the related data stored in the external memory 22 is updated.

Since update of the related data is performed in a power-on state of the reproducing apparatus 11, all updates can be detected. However, since unloading of the external memory 22 is performed not only in a power-on state of the reproducing apparatus 11 but also in a power-off state of the reproducing apparatus 11, it is difficult to detect all unloading of the external memory. Namely, if unloading of the external memory 22 is performed in a power-off state of the reproducing apparatus 11, modification of the external memory 22 is not detected when only the resume information is stored in the internal memory 38. As a result, reproduction of a virtual package which is different from a previous reproduction object is commenced from a previous reproduction-stop position.

The reproduction of the virtual package in cases like this will be described specifically with reference to FIG. 5.

Figure 5:
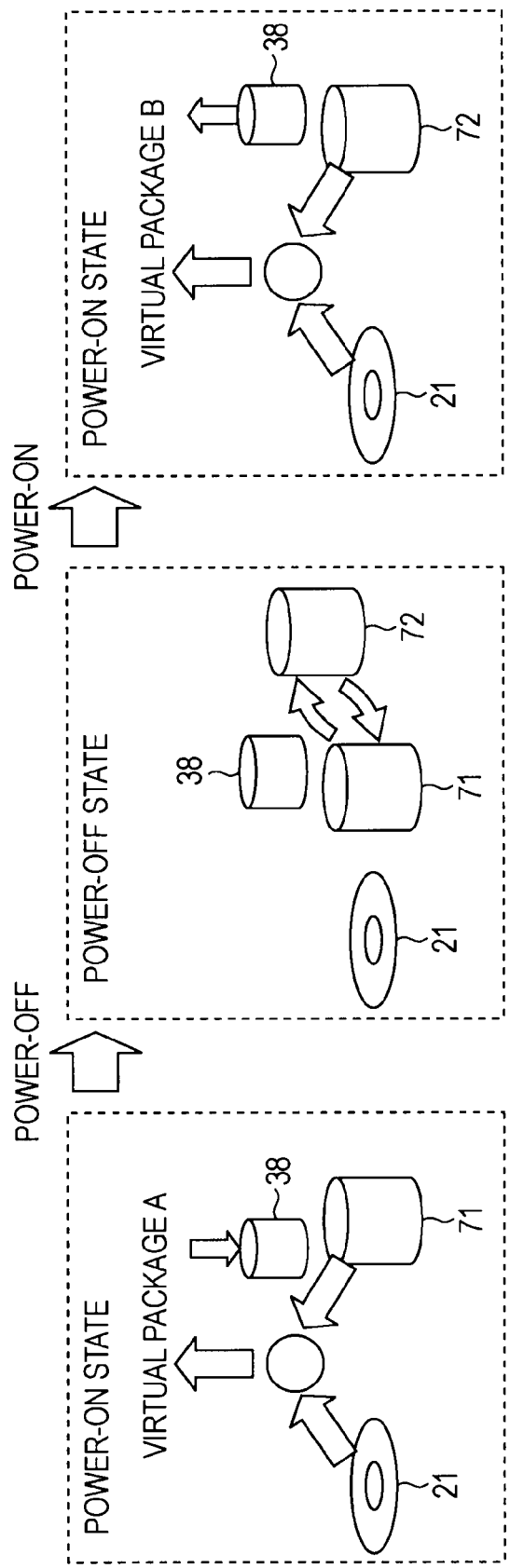
FIG. 5 is a schematic illustration specifically explaining a problem related to reproduction of the virtual package according to the embodiment of the present invention.

At first, in an example of an embodiment shown in FIG. 5, the disk 21 and an external memory 71 as the external memory 22 are loaded into the reproducing apparatus 11 in a power-on state. Then, when virtual package reproduction of the disk 21 is instructed, a virtual package A is reproduced by using the recorded data recorded in the disk 21 and the related data stored in the external memory 71, as shown at the left side of FIG. 5.

When reproduction stop is instructed, the resume information is stored in the internal memory 38 as shown at the left side of FIG. 5.

Next, the reproducing apparatus 11 is powered off. Then, as shown at the center of FIG. 5, the external memory 71 is unloaded from the reproducing apparatus 11 and a new external memory 72 is, as the external memory 22, loaded into the reproducing apparatus 11.

Then, when the reproducing apparatus 11 is powered on and virtual package reproduction of the disk 21 is instructed, the resume information stored in the internal memory 38 is read out as shown at the right side of FIG. 5. From a reproduction-stop position of the virtual package A based on the resume information, reproduction of a virtual package B is performed by using the recorded data stored in the disk 21 and related data stored in the external memory 72.

Therefore, the reproducing apparatus 11 stores the resume information and the package information when reproducing is halted. Then, by referring to the package information during reproduction, the reproducing apparatus 11 recognizes update of the related data and modification of the related data effected by a change of the external memory 22 and evaluates the effectiveness of the resume information. As a result, it is possible to reproduce only a virtual package identical to a previous reproduction object.

Reproduction method of the reproducing apparatus 11 will be described with reference to FIG. 6.

Figure 6:
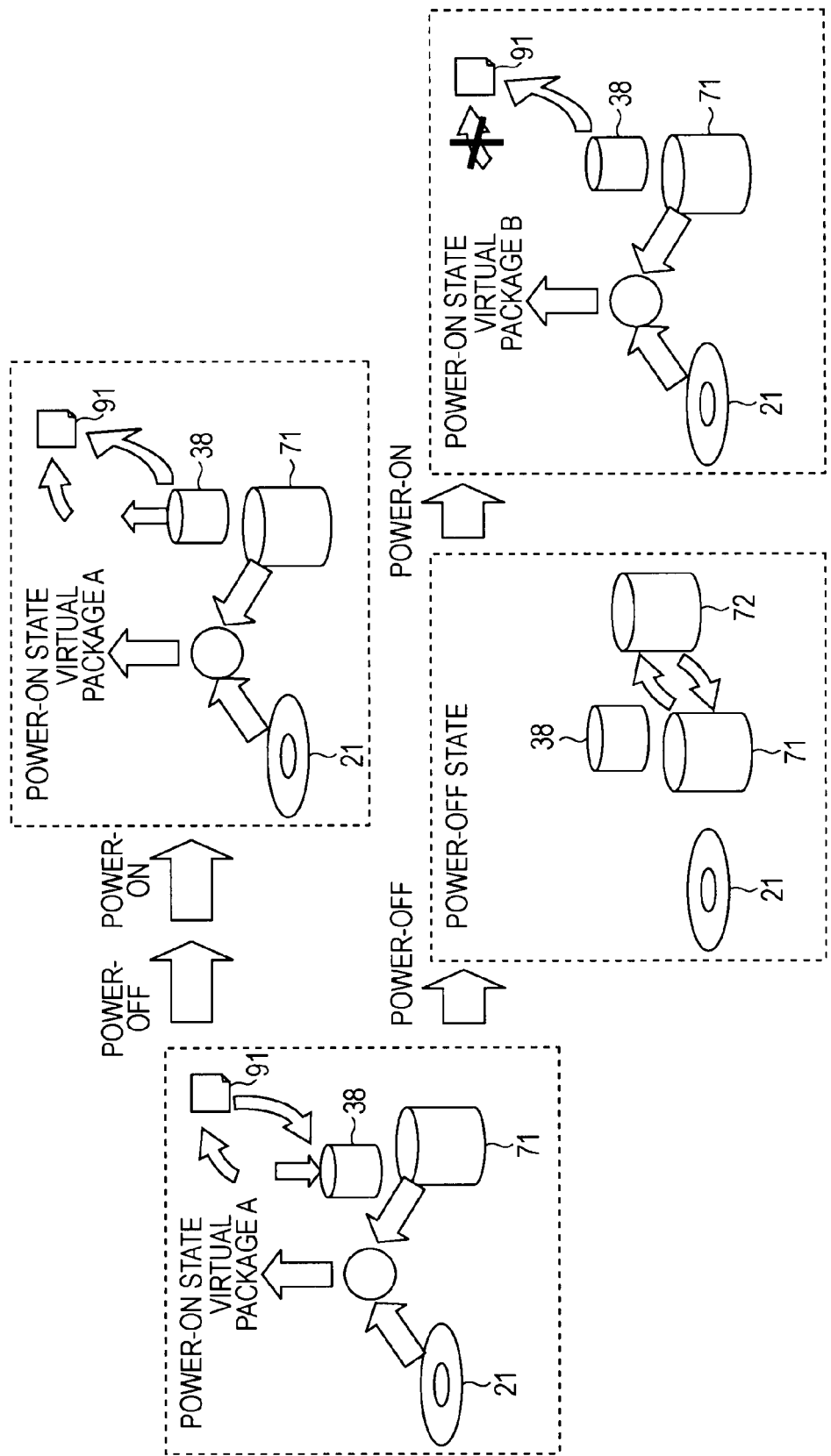
FIG. 6 is a schematic illustration explaining reproduction method performed in the reproducing apparatus according to the embodiment of the present invention.

At first, in an example of an embodiment shown in FIG. 6, the disk 21 and the external memory 71 as the external memory 22 are loaded into the reproducing apparatus 11 in a power-on state. Then, when virtual package reproduction of the disk 21 is instructed, the virtual package A is reproduced by using the recorded data recorded in the disk 21 and the related data stored in the external memory 71, as shown at the left side of FIG. 6.

And then, when reproduction stop is instructed, an electronic signature in the bumf.sf file is read out from the external memory 71 loaded into the reproducing apparatus 11, as shown at the left side of FIG. 6. Then, package information that contains specific information 91 including hash value of the electronic signature is generated and the package information and resume information are stored in the internal memory 38.

Next, when the reproducing apparatus 11 is powered off and then again powered on, the external memory 22 loaded into the reproducing apparatus 11 remains the external memory 71, as shown at the upper center of FIG. 6.

At this time, when virtual package reproduction is instructed, the electronic signature in the bumf.sf file is read out from the external memory 71 loaded into the reproducing apparatus 11. Then, specific information including hash value of the electronic signature is generated. In addition, the specific information 91 stored with resume information is read out from the internal memory 38, and whether the specific information 91 coincides with the generated specific information or not is determined.

In this case, since the generated specific information is identical to the specific information 91 read out from the internal memory 38, the virtual package is judged to be identical to a previous virtual package. Therefore, from a reproduction-stop position based on the resume information, reproduction of the virtual package is performed. As a result, from the previous reproduction-stop position, reproduction of the virtual package A which is identical to the previous virtual package is performed by using the recorded data stored in the disk 21 and the related data stored in the external memory 71.

On the other hand, as shown at the lower center of FIG. 6, when the reproducing apparatus 11 is powered off, the external memory 22 loaded into the reproducing apparatus 11 is altered from the external memory 71 to the external memory 72. Then, when the reproducing apparatus 11 is powered on, a reproduction condition shifts to a condition as shown at the lower right side of FIG. 6.

Specifically, when virtual package reproduction is instructed, specific information generated with an electronic signature in the external memory 72 loaded into the reproducing apparatus 11 is different from the specific information 91 stored in the internal memory 38.

Accordingly, the virtual package is judged to be different from a previously-reproduced virtual package and reproduction of the virtual package is performed from a starting position. As a result, reproduction of the virtual package B different from the previously-reproduced virtual package A is performed from the starting position by using the recorded data stored in the disk 21 and the related data stored in the external memory 71.

As described above, the reproducing apparatus 11 stores specific information with resume information into the internal memory 38, and the reproducing apparatus 11 performs reproduction of virtual package based on resume information only in the case that the specific information coincides with specific information in the external memory 22 presently loaded. As a result, when previous virtual package is different from the virtual package because of difference of related data even if the disk 21 of the virtual package is identical to that of the previous virtual package, it is possible to prevent reproduction-start position of the virtual package from coinciding with reproduction-stop position of the previous virtual package.

Next, processing of virtual package reproduction by the CPU 31 in FIG. 3 will be described with reference to a flowchart of FIG. 7. The processing of virtual package reproduction is commenced, for example, when a user operates the input section 36 and instructs virtual package reproduction of the disk 21. Here, in addition, it is assumed that validity of related data is confirmed with an electronic signature.

In step S11, the readout section 51 determines whether resume information and package information are stored in the internal memory 38 or not. In step S11, when it is determined that the resume information and package information are stored in the internal memory 38, the readout section 51 reads out the resume information and package information from the internal memory 38 and supplies the acquisition section 52 with the resume information and package information. In step S12, the acquisition section 52 determines whether package type included in the package information supplied from the readout section 51 indicates virtual package or not.

When, in step S12, it is determined that the package type indicates virtual package, the acquisition section 52, in step S13, reads out an electronic signature from bumf.sf file in the external memory 22 and supplies the package information generation section 55 with the electronic signature.

In step S14, the package information generation section 55 generates, as specific information, hash value of the electronic signature supplied from the acquisition section 52. In step S15, the acquisition section 52 determines whether specific information generated by the package information generation section 55 coincides with specific information included in the package information supplied from the readout section 51 or not.

When, in step S15, it is determined that the specific information generated by the package information generation section 55 coincides with the specific information included in the package information supplied from the readout section 51, processing proceeds to step S16. In step S16, the acquisition section 52 reads out recorded data on the disk 21 from a previous reproduction-stop position based on the resume information supplied from the readout section 51.

On the other hand, when, in step S11, it is determined that the resume information and package information are not stored, the acquisition section 52, in step S17, reads out recorded data on the disk 21 from a starting position.

In addition, when, in step S12, it is determined that the package type does not indicate virtual package, namely, a previous reproduction is disk package reproduction, the above-described processing is performed in step S17.

Furthermore, when, in step S15, it is determined that the specific information generated by the package information generation section 55 does not coincide with the specific information included in the package information supplied from the readout section 51, processing proceeds to step S17. That is, when a previously-reproduced virtual package is different from a presently-reproduced virtual package, processing proceeds to step S17. Then, the above-described processing is performed in step S17.

Then, in step S18 after processing of step S16 or of step S17, the acquisition section 52, from the external memory 22, reads out related data related to recorded data to be read out, based on bumf.xml file stored in the external memory 22.

In step S19, the reproduction section 53 generates virtual package by using recorded data and related data which are read out. In step S20, the reproduction section 53 reproduces the virtual package by outputting the virtual package as reproduced data to the display apparatus 12.

In step S21, the resume information generation section 54 determines whether to halt reproduction or not, for example, whether a user instructs to halt virtual package reproduction by operating the input section 36 or not. In step S21, when it is determined not to halt reproduction, the resume information generation section 54 stands by till it is determined to halt reproduction.

Also, when, in step S21, it is determined to halt reproduction, the resume information generation section 54, in step S22, generates resume information and supplies the memory control section 56 with the resume information. In step S23, the package information generation section 55 generates package information including package type indicating a virtual package and specific information generated in step S14 and supplies the memory control section 56 with the package information.

In step S24, the memory control section 56 causes the internal memory 38 to store the resume information supplied from the resume information generation section 54 and the package information supplied from the package information generation section 55. Then, processing is terminated.

As described above, the reproducing apparatus 11 can reproduce the virtual package generated by using the recorded data recorded in the disk 21 and the related data stored in the external memory 22. As a result, a user can view an image having a different content or listen to audio having a different content out of the same disk 21 by loading the external memory 22 into the reproducing apparatus 11.

Figure 8:
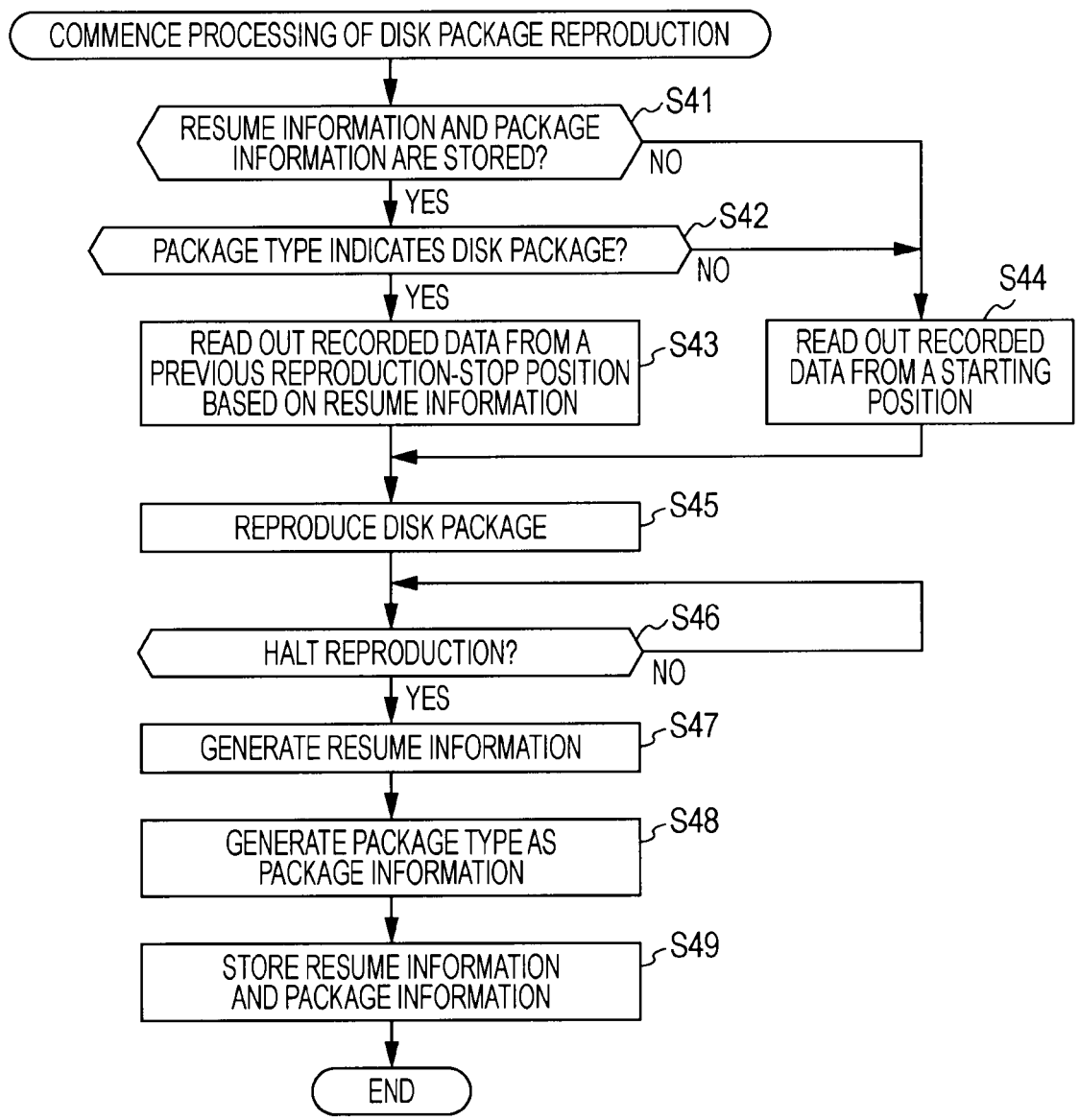
FIG. 8 is a flowchart explaining reproduction processing of the disk package according to the embodiment of the present invention.

Next, processing of disk package reproduction by the CPU 31 in FIG. 3 will be described with reference to a flowchart of FIG. 8. The processing of disk package reproduction is commenced, for example, when a user operates the input section 36 and instructs disk package reproduction of the disk 21.

In step S41, the readout section 51 determines whether resume information and package information are stored in the internal memory 38 or not. In step S41, when it is determined that the resume information and package information are stored in the internal memory 38, the readout section 51 reads out the resume information and package information from the internal memory 38 and supplies the acquisition section 52 with the resume information and package information. In step S42, the acquisition section 52 determines whether package type included in the package information supplied from the readout section 51 indicates disk package or not.

Processing proceeds to step S43 when, in step S42, it is determined that the package type indicates disk package. In step S43, the acquisition section 52 reads out recorded data on the disk 21 from a previous reproduction-stop position based on the resume information supplied from the readout section 51 and supplies the reproduction section 53 with the recorded data.

On the other hand, when, in step S41, it is determined that the resume information and package information are not stored, the acquisition section 52, in step S44, reads out recorded data on the disk 21 from a starting position and supplies the reproduction section 53 with the recorded data.

In addition, when, in step S42, it is determined that the package type does not indicate disk package, namely, when a previous reproduction is virtual package reproduction, the above-described processing is performed in step S44.

Then, after processing of step S43 or of step S44, processing proceeds to step S45. In step S45, the reproduction section 53 performs disk package reproduction by directly treating, as disk package, the recorded data supplied from the acquisition section 52 and outputting the disk package as reproduced data to the display apparatus 12.

Figure 7:
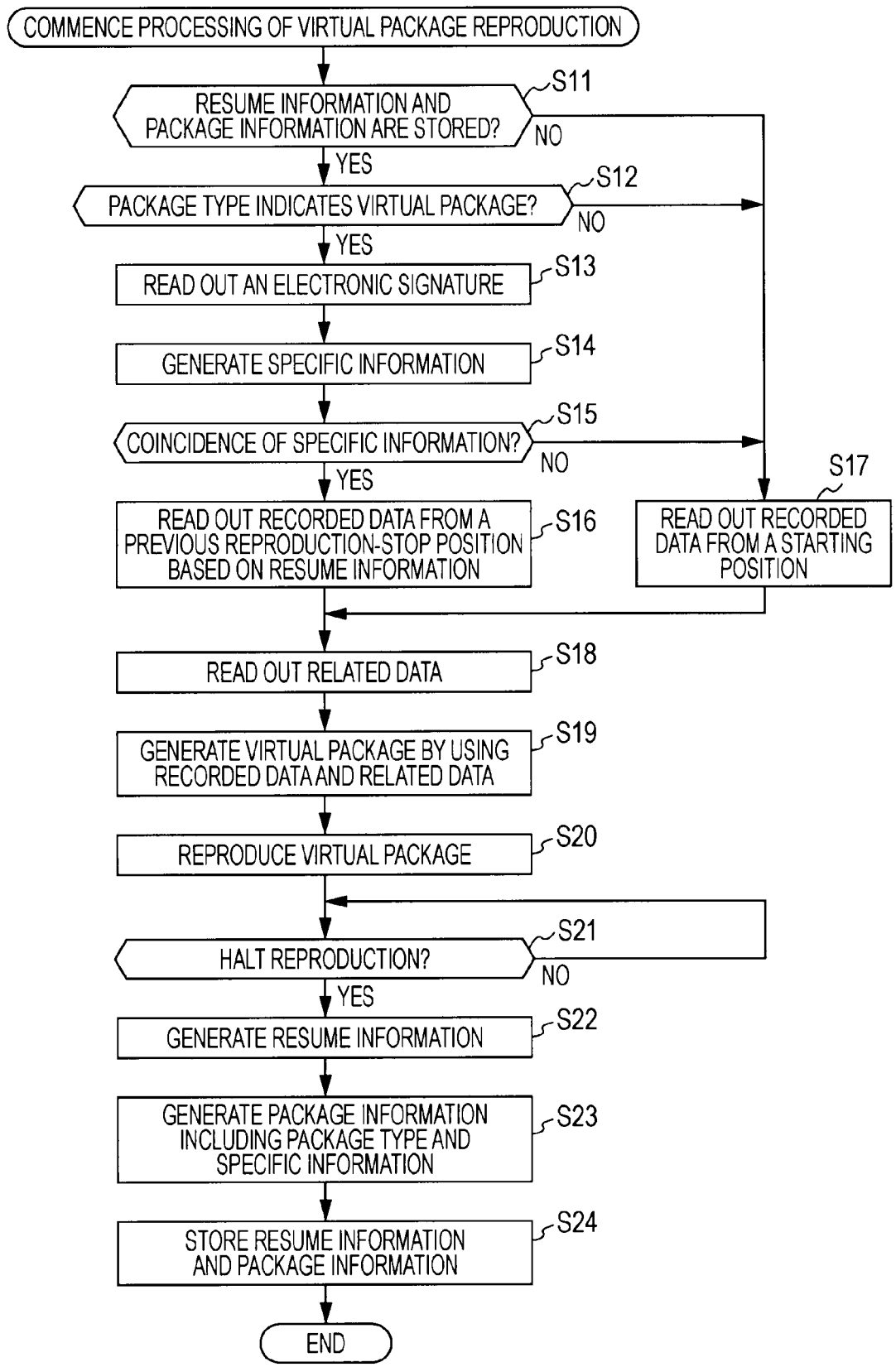
FIG. 7 is a flowchart explaining reproduction processing of the virtual package according to the embodiment of the present invention.

In step S46, the resume information generation section 54 determines whether to halt reproduction or not, in the same processing as step S21 shown in FIG. 7. In step S46, when it is determined not to halt reproduction, the resume information generation section 54 stands by till it is determined to halt reproduction.

Also, when it is, in step S46, determined to halt reproduction, the resume information generation section 54, in step S47, generates resume information and supplies the memory control section 56 with the resume information. In step S48, the package information generation section 55 generates, as package information, package type indicating a disk package and supplies the memory control section 56 with the package type.

In step S49, the memory control section 56 causes the internal memory 38 to store the resume information supplied from the resume information generation section 54 and the package information supplied from the package information generation section 55. Then, processing is terminated.

In addition, it is possible to store related data in the internal memory 38 as a local Built-in Storage which a user hardly unloads or adds on. In this case, for example, the related data is acquired through Internet by the communication section 39 and stored in the internal memory 38.

Also, in the specification, steps describing program stored in a program recording medium includes parallel or individual processing, not necessarily performed in chronological order, as well as time-series processing performed along described sequence.

In addition, in the specification, a system represents a whole apparatus including a plurality of apparatus.

The present application contains subject matter related to that disclosed in Japanese Priority Patent Application JP 2008-218009 filed in the Japan Patent Office on Aug. 27, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus comprising:
   a processor;
   an acquisition section, implemented by the processor, configured to read out recorded data from a disk and acquire related data related to the recorded data from a memory source that is different than the disk;
   a reproducing section, implemented by the processor, configured to generate data by using the recorded data read out by the acquisition section and the related data acquired by the acquisition means and output the data as reproduced data;
   a generating section, implemented by the processor, configured to generate specific information that specifies the related data based on data appended to the related data acquired by the acquisition means, the specific information being a hash value of an electronic signature provided from the acquisition section; and
   a memory control section, implemented by the processor, configured to cause memory means to store reproduction-stop position information indicating reproduction-stop position on the disk and the specific information when the reproduction of the reproducing section is halted.

2. The reproducing apparatus according to claim 1, wherein the acquisition section reads out the recorded data from the reproduction-stop position indicated by the reproduction-stop position information stored in the memory means when the specific information stored in the memory means coincides with the specific information generated by the generating section.

3. The reproducing apparatus according to claim 2, wherein the acquisition section does not read out the recorded data from the reproduction-stop position indicated by the reproduction-stop position information stored in the memory means when the specific information stored in the memory means does not coincide with the specific information generated by the generating section, and the acquisition section reads out the recorded data from a starting position of the disk.

4. The reproducing apparatus according to claim 1, wherein
   the reproducing section performs special reproduction in which data generated by using the recorded data and the related data is outputted as reproduced data and normal reproduction in which the recorded data read out by the acquisition section is directly outputted as the reproduced data; and the memory control section causes the reproduction-stop position information and the specific information to be stored when the special reproduction of the reproducing section is halted, and causes the reproduction-stop position information to be stored when the normal reproduction of the reproducing section is halted.

5. A reproducing method performed in a reproducing apparatus, the reproducing method comprising the steps of:

acquiring related data related to recorded data with reading out the recorded data from a disk, the related data being acquired from a memory source that is different than the disk;

reproducing data with generating the data by use of the recorded data read out by the acquiring step and the related data acquired by the acquiring step and outputting the data as reproduced data;

generating specific information that specifies the related data based on data appended to the related data acquired by the acquiring step, the specific information being a hash value of an electronic signature; and controlling memory means to store reproduction-stop position information indicating reproduction-stop position on the disk and the specific information when the reproduction of the reproducing step is halted.

6. A non-transitory computer readable storage medium encoded with computer executable instructions, which when executed by a reproducing apparatus, cause the reproducing apparatus to perform a method comprising:

acquiring related data related to recorded data with reading out the recorded data from a disk, the related data being acquired from a memory source that is different than the disk;

reproducing data with generating the data by use of the recorded data read out by the acquiring step and the related data acquired by the acquiring step and outputting the data as reproduced data;

generating specific information that specifies the related data based on data appended to the related data acquired by the acquiring step, the specific information being a hash value of an electronic signature; and controlling memory means to store reproduction-stop position information indicating reproduction-stop position on the disk and the specific information when the reproduction of the reproducing step is halted.

\* \* \* \* \*